3,017,803
MINIATURE MOTION PICTURE CAMERA
Yoshinobu Sakaki, 5 Kikusakacho 1-chome,
Nagoya, Japan
Filed Jan. 19, 1959, Ser. No. 787,726
Claims priority, application Japan Jan. 17, 1958
3 Claims. (Cl. 88—16)

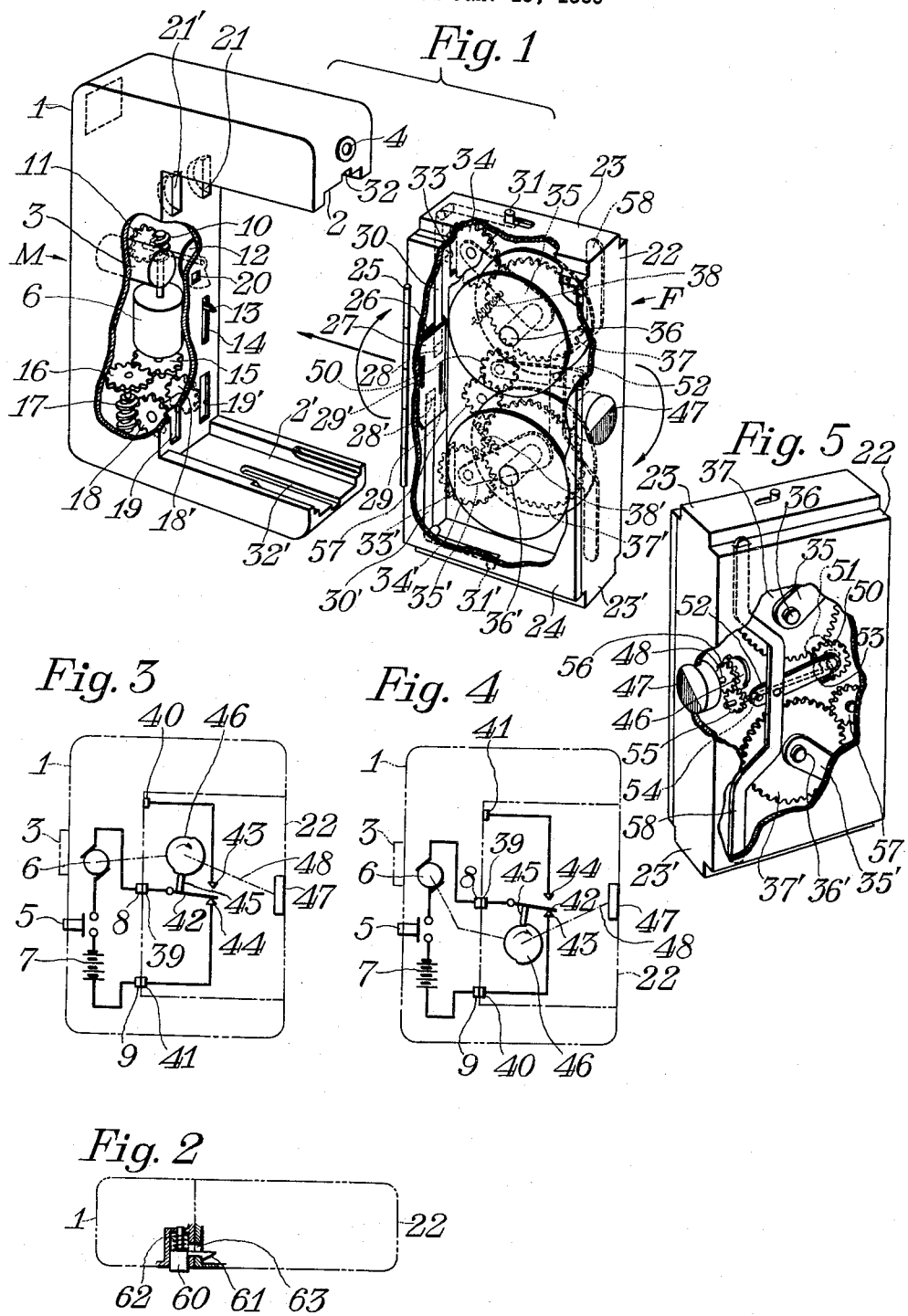

This invention relates to a miniature motion picture camera, particularly such camera employing a double 8 mm. film and two spools therefor.

The motion picture camera according to this invention consists of a camera body and a detachable film case assembly, said camera body containing a lens, a shutter mechanism and a driving power means for driving the shutter mechanism and film feeding mechanism, wherein the camera body contains two power transmission gears, and the said detachable film case assembly contains two spool shafts each having a gear on the same side and is adapted in its inverted as well as in its normal position to be mounted to said camera body, each of said gears on said spool shafts being adapted to be brought into mesh with either one of said two transmission gears in the camera body regardless of the normal or inverted position of the mounted film case.

An object of the invention is to provide a miniature motion picture camera equipped with a detachable film case assembly containing two conventional spools which may be operatively connected with the camera body containing the driving motor in the inverted as well as in the normal positions relative to the camera body, so that the feed spool is converted into the takeup spool for reversing the feed of the film for exposure of the remaining half of the double 8 mm. film without opening the film case and without interchanging the mount of the spools within the case at the end of the first half width exposure.

Another object is to provide a motor driven motion picture camera adapted for reverse feed of the double 8 mm. film in which is provided means for automatically stopping the feed of the film at the end of the effective length of the film feed.

Other and further objects of the invention will be obvious upon an understanding of the illustrative embodiment about to be described, or will be indicated in the appended claims, and various advantages not referred to herein will occur to one skilled in the art upon employment of the invention in practice.

In the accompanying drawing,

FIGURE 1 is a somewhat schematic perspective view partly in section of the motor driven minature motion picture camera according to this invention, with the film case assembly shown as detached from the camera body;

FIGURE 2 is a section of the device for locking the film case assembly connected to the camera body;

FIGURE 3 is a wiring diagram of the motor circuit;

FIGURE 4 is a similar diagram when the film case assembly is in the inverted position; and FIGURE 5 is a schematic view showing the footage meter mechanism.

Referring to the drawing, M generally designates a camera body assembly containing a conventional shutter mechanism, a driving motor, and a gear train for actuating the take-up spool. The body 1 is substantially U-shaped, and two legs thereof are provided on the inner sides with guide ways 2 and 2', respectively, along which the film case assembly F to be hereinafter described is adapted to be inserted and mounted in the camera body. In the body 1 is mounted a lens 3, a view finder 4, a start button 5 (FIGS. 3 and 4), the driving motor 6, and a battery 7. This battery may be replaced by any source of current provided outside of the camera body. At the ends of the circuit connecting in series the start button 5, the motor 6 and the battery 7, there are two contacts 8 and 9 which are located on the inner side of the bottom of the U-shaped body 1. The motor 6 drives the shutter 12 and an intermittent feed mechanism through a worm 10 and a pinion 11. A feed pawl 13 is shown as protruding through a slot 14 formed in the wall of the body 1, as will be seen from FIGURE 1. Conventional devices (not shown) for adjusting the shutter mechanism 12 and the intermittent feed mechanism are provided in the body 1. The motor 6 is employed also for driving the take-up spool contained in the film case assembly F hereinafter to be described. For this purpose, the motor shaft is provided with a gear 15 meshing with a gear 16. The shaft of said gear 16 has a worm 17 meshing with a gear 18 having a horizontal shaft. At the other end of said shaft, there is a similar gear 18'. Adjacent the teeth of said gears 18 and 18', there are provided two slots 19 and 19', respectively, in the vertical wall of the body 1, the plane of the slots being preferably tangential to the pitch circle of the gears 18 and 18'. On the upper end of the vertical wall of the body 1, there are similar slots or depressions 21 and 21' which are located in the symmetrical relation with respect to the aforementioned slots 19 and 19'.

The film case assembly F consists of a case 22 of the size adapted to be slid between the two legs of the aforementioned U-shaped body 1, and has slides 23 and 23' respectively on the top and bottom sides of the case. A cover plate 24 is hinged as at 25, and is provided with a conventional locking device (not shown). The case 22 is divided by a partition wall into two compartments, one for accommodating the film spools and made light-tight, and the other for accommodating the film feeding mechanism and footage meter.

In the case 22, adjacent the front wall, there is a conventional aperture plate 26 and a pressure plate 27. The aperture plate 26 has two apertures 28 and 28' located in offset positions, and two slots 29 and 29' for receiving the feed pawl 13 projecting through the slot 14 of the camera body. Said apertures 28 and 28' and the slots 29 and 29' are so designed and arranged that, when the film case 22 is mounted to the camera body, only one set of said aperture and slot comes in register respectively with the window 20 and the slot 14 provided in the camera body wall, and that when the film case 22 is mounted in the inverted position the other set of the aperture and slot comes in register respectively with the same window 20 and the slot 14.

For the purpose of preventing the light entering through the apertures 28 and 28' when the film case 22 is detached from the camera body, there are provided two shutter bands 30 and 30' for separately closing the apertures 28 and 28'. Said shutter bands are preferably made of plastic material, and are extended to the inner sides of the top and bottom of the case 22. The shutter bands have pins 31 and 31', respectively at their free ends, said pins being protruded outwardly through oblong slots. Each shutter band is normally urged inwardly to close the aperture 28 or 28' by means of a suitable spring (not shown), and said pin 31 or 31' is held at the front end (left end in FIGURE 1) of the oblong slot. In the guide ways 2 and 2' of the camera body, there are formed shutter band actuating channels 32 and 32' for receiving said pins 31 and 31', respectively. The upper channel 32 is so dimensioned that, when the film case 22 is mounted to the camera body 1, the pin 31 abuts against the inner end of the channel, so that the shutter band 30 is pulled rearwardly to open only the aperture 28. On the other hand, the lower channel 32' is made long enough to prevent that abutment of the pin 31' against the inner end of the channel 32′, so that the aperture 28′ is held closed. From the foregoing, it will be seen that whether the film case 22 is mounted in the normal position, or in the inverted position, the lower aperture 28′ or 28 would always be held closed, and that the upper aperture 28 or 28′ only is opened.

In the front wall of the case 22, there are formed two slots 33 and 33′ at the position displaced laterally from the center line of the case. Protruding slightly through said slots 33 and 33′, there are gears 34 and 34′ which are to be meshed with the gears 18 and 18′, respectively. These gears 34 and 34′ are carried by arms 35 and 35′, respectively, which are rockably mounted upon the spool shafts 36 and 36′ respectively. Said gears 34 and 34′ are in mesh with gears 37 and 37′ mounted to the spool shafts 36 and 36′ respectively, through conventional slip device. The gears 34 and 34′ are permanently in mesh with the gears 37 and 37′, respectively, irrespective of the angular position of the arms 35 and 35′. Said arms 35 and 35′ are normally urged in the clockwise and counterclockwise directions, respectively, by means of tension springs 38 and 38′, so that the gears 34 and 34′ are always urged toward and through the slots 33 and 33′.

On the front fact of the case 22, there are three contacts 39, 40 and 41, the middle contact 39 being adapted to co-operate always with the contact 8 on the camera body regardless of the normal or inverted position of the mounted film case 22, whilst the other two contacts 40 and 41 being adapted to alternately contact with the other contact 9 on the camera body according to the position of the mounted film case 22, as shown in FIGURES 3 and 4. Said two contacts 40 and 41 are connected to stationary contacts 43 and 44, respectively, which are provided in the case 22, and the middle or common contact 39 is connected to a switch arm or movable contact 42 which is adapted to alternately contact with said stationary contacts 43 and 44. Said switch arm 42 has a follower pin 45 biased against and co-operating with a rotary cam disc 46. The rotary cam 46 consists of a combination of two semi-circular discs, the radius of one half disc being slightly larger than that of the other. In other words, the cam face of the cam 46 consists of a small radius semi-circle and larger radius semi-circle connected by two stepped portions. The cam shaft 48 is operatively connected to one or the other of the spool gears through the mechanism to be hereinafter described. The shaft 48 is connected to a footage meter 47, the face of which is preferably divided into two differently colored zones for the purpose of identification of the film feed for the first half width and for the reversed feed for the exposure of the second half width of the film.

Referring to FIGURE 5, in which the film case 22 is shown as detached from the camera body, 50 is a gear meshing with the upper spool gear 37 and having a worm 51 on its shaft carried by the free end of a lever 52. Meshing with said worm 51 is a gear 53 on one end of a shaft 54. On the other end of said shaft 54 is a gear 55 meshing with a gear 56 on the cam shaft 48. An intermediate gear 57 of same diameter as the gear 50 is in mesh with the lower spool gear 37′. Fulcrumed at a mid point of the lever 52 is an actuating rod 58, of which upper end is normally held slightly protruded from the case 22 and is adapted to be pushed inwardly when the case 22 is slid into and mounted to the camera body, so that the gear 50 is disengaged from the spool gear 37 and is brought into mesh with the intermediate gear 57 meshing with the lower spool gear 37′.

When the film case 22 is slid into the camera body and mounted thereto, it is required to hold the same in the locked position. For the purpose, any conventional locking device may be provided. In FIGURE 2 is illustrated an example of such lock, which comprises a push button 60 having a hooked latch 61 and biased outwardly by a spring 62. The hooked latch 61 protrudes through an oblong slot 63 in the camera body and through a similar slot formed in the front wall of the film case 22, and the film case is held locked by the engagement of the hook of the latch 61 with the edge of the slot in the wall of the film case. When the push button 60 is pushed against the action of the spring 62, the hook of the latch 61 will be disengaged from the wall of the film case, whereby the latter may be removed from the camera body.

When the film case 22 is slid in the direction of the straight arrow in FIG. 1 along the guide ways 2 and 2′ into the camera body 1 and mounted thereto, the lower gear 34′ meshes with the gear 18′ through the slot 19′, whereby upon the start of the motor 6 the take-up spool shaft 36′ is driven, whilst the teeth of the upper gear 34 is merely protruding into the slot or depression 21 of the camera body and is by no means driven, since there is no driving gear in said slot 21. By downward shift of the rod 58, the gear 50 meshes with the lower spool gear 37′ through the intermediate gear 57, and the rotary cam 46 rotates in clockwise direction in FIGURE 3.

On the other hand, when the film case 22 is inverted as shown by curved arrows and slid into the camera body, the upper gear 34, now the lower gear, meshes with and is driven by the gear 18 through the slot 19, thereby the shaft 36 of the spool 35, which has been formerly acting as the feed spool but now as the take-up spool, will be driven thereby. The protruded portion of the gear 34′, now in the upper position, is located in the upper slot or depression 21′ and is by no means driven. When the film case 22 is inverted, the protruding end of the rod 58 shown in FIG. 5 will be in the upper end position, and this protruding end will be pushed in by engagement with the inner wall of the upper leg of the camera body 4 when the film case 22 is slid into the space between the two legs, so that the rod 58 will be shifted downwardly, i.e. upwardly in FIG. 5. By this movement, the gear 50 is disengaged from the intermediate gear 57 and brought into mesh directly with the spool gear 37, and the cam 46 continues to rotate in a clockwise direction in FIG. 4.

In the mounted position of the film case assembly, one of the apertures 28 and 28′ which is in register with the window 20 is open, and the feed pawl 13 reaches the film perforations through the slot 29 or 29′ in the front wall of the case 22. The footage meter 47 and the rotary cam 46 is positioned in zero position as shown in FIGURE 3. By pushing the start button 5, the circuit will be completed through the battery 7, the start button 5, the motor 6, the contacts 8 and 39, the movable contact 42, the stationary contact 44, the contacts 41, 9 and the battery 7, whereby the motor 6 is driven and the mechanism is operated. The cam 46 rotates clockwise. At the end of 25 feet exposure of the first half width of the film, the pin 45 of the contact arm 42 reaches the end of the larger radius semi-circular cam face. When the said pin 45 is transferred to the smaller radius semi-circular face, the movable contact 42 will be transferred from the stationary contact 44 to the other stationary contact 43, whereby the above mentioned circuit is opened and the feed of the film will be automatically stopped. The film still remains wound around the feed spool in position ready for performing next reversed feed. Now, the film case 22 is inverted and mounted in the camera body as shown in FIG. 4, in which position the spool formerly acted as the take-up spool is now on the feed side. By actuating the push button 5, the circuit is completed through the battery 7, the start button 5, the motor 6, the contacts 8, 39, the movable contact 42, the stationary contact 43, the contacts 40, 9, and the battery 7, whereby the motor 6 is driven. The cam 46 rotates clockwise. At the end of the reversed 25 feet feed of the film for the second half width exposure, the pin 45 of the contact arm 42 reaches the end of the smaller radius semi-circular cam face, and will soon ride upon the larger radius semi-circular cam face, whereby the movable contact 42 is transferred from the contact 43 to the other contact 44, automatically stopping the feed of the film.

What I claim is:

1. A motion picture camera comprising, a U-shaped camera body portion having two substantially parallel legs provided with inner guide ways, and including a lens, a film feeding mechanism comprising two axially spaced power transmission gears mounted to be driven from said drive means, said body portion having an end wall spanning an inner end of each of the two legs with the opposite end of the legs being open, said inner wall having an exposure aperture, a shutter mechanism operable to control picture-taking through said lens and aperture, drive means for driving the shutter mechanism, said wall having two spaced openings, said two gears having respective pitch circles disposed substantially in the plane of a respective one of the openings, said plane substantially corresponding to said wall of said U-shaped camera body portion, a detachable film magazine having top and bottom slides and positionable in a first position and a second upended position with said slides disposed in said guide ways so that the magazine is accommodated between the two legs of said camera body portion, said film magazine including two spool shafts each having a drive gear to alternatively drive its respective shaft alternatively in dependence upon the film magazine being in its first or upended second position and disposed to mesh with a respective one only of said two power transmission gears in the camera body portion when the film magazine is mounted in the camera body portion in the first position or the second position, said film magazine having a front end wall provided with two spaced openings through which the last-mentioned gears partially protrude and two offset exposure apertures positionable alternatively in registry with the first-mentioned exposure aperture so that only one of the two exposure apertures registers therewith when the magazine is in one of its two positions, means in said magazine cooperative with said guide ways for automatically masking said two exposure apertures when the magazine is removed from the camera body portion and for automatically unmasking a respective one of the exposure apertures corresponding to the position in which the magazine is positioned in said guide ways.

2. A miniature motion picture camera as claimed in claim 1, in which the film magazine assembly includes a film footage meter driven alternatively from one of the gears on the spool shafts having means for indicating exposure of film footage corresponding to film exposed in respective ones of said two positions of the film magazine, a gear mechanism for operably driving alternatively the footage meter from the individual gears on the spool shafts in dependence upon which one of said two positions the magazine is placed in said camera body portion, and said gear mechanism having means operable by said guide ways for establishing operational driving connection between the footage meter and said gears on the spool shafts and for changing over operational connection between said footage meter and the gears on the spool shafts alternatively to cause the film footage meter to indicate exposure of film corresponding to the position in which the film magazine is inserted between the guide ways.

3. A miniature motion picture camera as claimed in claim 1, in which the camera body portion drive means includes an electric motor for driving the shutter mechanism and the film feeding mechanism, a motor branch circuit having a start switch for the motor, a source of current in said branch circuit for the motor, and two terminals in said circuit external of the camera body portion on said wall thereof, and the detachable film magazine includes two branch circuits having a common contact on said end wall in operation always electrically connected to one of said two terminals in the camera body portion each having a contact on said end wall alternatively electrically connected to the other terminal in the camera body portion in dependence upon the film magazine being in its first or second position relative to the camera body portion thereby to form a complete electric circuit between the first-mentioned branch circuit and one of said two branch circuits in said magazine in dependence upon said positions thereof, means in said magazine to automatically break said completed circuit once a given length of film footage has been exposed with the magazine in one of said two positions, whereby the drive motor is automatically stopped once said given film footage is exposed, and said given film footage corresponding to the length of film to be exposed when the magazine is in either of said positions.

References Cited in the file of this patent

UNITED STATES PATENTS

| 2,008,110 | Scheibell | July 16, 1935 |
| 2,226,175 | Merriman et al. | Dec. 24, 1940 |
| 2,226,363 | Williams | Dec. 24, 1940 |
| 2,505,661 | Briskin et al. | Apr. 25, 1950 |
| 2,819,663 | Lachaize | Jan. 14, 1958 |

FOREIGN PATENTS

| 450,792 | Great Britain | July 23, 1936 |
| 475,794 | Great Britain | Nov. 22, 1937 |
| 1,172,261 | France | Oct. 13, 1958 |